United States Patent [19]
Clouser et al.

[11] Patent Number: 5,884,053
[45] Date of Patent: Mar. 16, 1999

[54] CONNECTOR FOR HIGHER PERFORMANCE PCI WITH DIFFERENTIAL SIGNALING

[75] Inventors: Paul L. Clouser, Stamford, Conn.; Richard Allen Kelley, Apex, N.C.; Danny Marvin Neal, Round Rock; Charles Bertram Perkins, Jr., Cedar Park, both of Tex.

[73] Assignee: International Business Machines Corporation, Armonk, N.Y.

[21] Appl. No.: 873,347

[22] Filed: Jun. 11, 1997

[51] Int. Cl.⁶ ................................................... G06F 13/00
[52] U.S. Cl. ........................... 395/306; 395/309; 395/281; 395/882
[58] Field of Search ..................................... 395/306, 309, 395/281, 882, 822, 675

[56] References Cited

U.S. PATENT DOCUMENTS

| | | | |
|---|---|---|---|
| 3,713,105 | 1/1973 | Rogers | 340/825.79 |
| 4,433,215 | 2/1984 | Wortman | 370/284 |
| 5,214,318 | 5/1993 | Nakanishi et al. | |
| 5,445,725 | 8/1995 | Koide et al. | |
| 5,485,488 | 1/1996 | Van Brunt et al. | |
| 5,493,657 | 2/1996 | Van Brunt et al. | 395/308 |
| 5,507,002 | 4/1996 | Heil | |
| 5,522,050 | 5/1996 | Amini et al. | |
| 5,530,392 | 6/1996 | Runas et al. | |
| 5,533,204 | 7/1996 | Tipley | |
| 5,535,377 | 7/1996 | Parks | |
| 5,559,968 | 9/1996 | Stancil et al. | |

*Primary Examiner*—Meng-Ai T. An
*Assistant Examiner*—Ario Etienne
*Attorney, Agent, or Firm*—Richard A. Henkler; Daniel E. Venglarik; Andrew J. Dillon

[57] ABSTRACT

An enhanced PCI bus architecture utilizing differential signaling is supported by an adapter slot connector providing differential signaling pins and a make-before-break connection between bus conductors and dummy loads for each bus conductor, enabling higher frequency and higher bandwidth operation. The dummy loads simulate the signal load of an adapter inserted into the slot. The PCI bus conductors are automatically disconnected from the dummy loads and connected to the adapter pins when an adapter is inserted into the slot. A balanced load bus is thus provided regardless of whether adapter slots are populated or empty.

22 Claims, 5 Drawing Sheets

CONNECTOR FOR HIGHER PERFORMANCE PCI WITH DIFFERENTIAL SIGNALING

RELATED APPLICATIONS

The present invention is related to the subject matter of the following commonly assigned copending U.S. patent applications: Ser. No. 08/872,824 (Docket No. AT9-96-330), filed Jun. 11, 1997 entitled "ENHANCED HIGH PERFORMANCE PCI"; and Ser. No. 08/872,823 (Docket No. AT9-97-037) filed Jun. 11, 1997, entitled "DRIVER/RECEIVER CIRCUITRY FOR ENHANCED PCI WITH DIFFERENTIAL SIGNALING." The content of the above-mentioned copending applications is incorporated herein by reference.

BACKGROUND OF THE INVENTION

1. Technical Field:

The present invention relates in general to bus architectures in data processing systems and in particular to connectors employed with the PCI bus architecture. Still more particularly, the present invention relates to providing an improved connector to be employed in an PCI bus architecture utilizing differential signaling.

2. Description of the Related Art:

Data processing systems typically experience data bottlenecks under older input/output (I/O) standard architectures such as the Industry Standard Architecture (ISA) and Extended Industry Standard Architecture (EISA). These bottlenecks arise when data transfers are unable to keep pace with the requirements of a processing unit or other component within the data processing system. Alternative I/O architectures have been developed to eliminate such bottleneck by providing higher bandwidth buses. One such alternative is the peripheral component interconnect (PCI) local bus, a high performance 32-bit or 64-bit bus with multiplexed address and data lines. The mechanical, electrical, and operational characteristics for the current PCI local bus standard may be found in PCI Local Bus Specification, Revision 2.1 ("the current PCI specification"), available from the PCI Special Interest Group in Portland, Oreg. The current PCI specification and/or variants are expected to be employed in data processing systems for a considerable time into the future.

The PCI local bus specification provides a processor-independent interface to add-in boards, also commonly referred to as expansion cards or adapters. Because of AC switching characteristic limitations, a PCI bus is typically limited in both data transfer rate and fan-out (number of adapter slots supported). Data transfer rate and fan-out in a PCI bus are interdependent, such that achieving an increase in one generally results in a decrease in the other. The current 33 MHz 64-bit PCI architecture definition provides a peak data transfer rate of 264 MB/s and supports up to 4 slots per PCI I/O bus. This data rate is slow for many high performance adapters under contemporary workstation requirements. The current 66 MHz PCI architecture definition provides a peak data transfer rate of 528 MB/s, but only supports up to 2 slots per PCI I/O bus. This fan-out is extremely restrictive, limiting the usefulness of 66 MHz PCI architecture.

A high performance, general purpose parallel I/O bus similar to PCI, but with better performance and fan-out than provided by the current 66 MHz PCI definition, may be provided. The enhanced bus architecture builds upon the current 66 MHz PCI architecture but is not backwards-compatible with the existing PCI bus architecture specification since the connectors employed for the existing PCI bus architectures cannot be employed for the enhanced bus architecture. It would be desirable, therefore, to provide a connector supporting the enhanced bus architecture.

SUMMARY OF THE INVENTION

It is therefore one object of the present invention to provide an improved bus architecture enabling higher frequency and performance capability for data processing systems.

It is another object of the present invention to provide an improved connector employed with the enhanced bus architecture described, enabling higher frequency and performance capability.

It is yet another object of the present invention to provide an improved connector to be employed in an enhanced bus architecture utilizing differential signaling. The connector may include both a 32-bit and a 64-bit connector.

The foregoing objects are achieved as is now described. An enhanced PCI bus architecture utilizing differential signaling is supported by an adapter slot connector providing differential signaling pins and a make-before-break connection between bus conductors and dummy loads for each bus conductor, enabling higher frequency and higher bandwidth operation. The dummy loads simulate the signal load of an adapter inserted into the slot. The PCI bus conductors are automatically disconnected from the dummy loads and connected to the adapter pins when an adapter is inserted into the slot. A balanced load bus is thus provided regardless of whether adapter slots are populated or empty.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
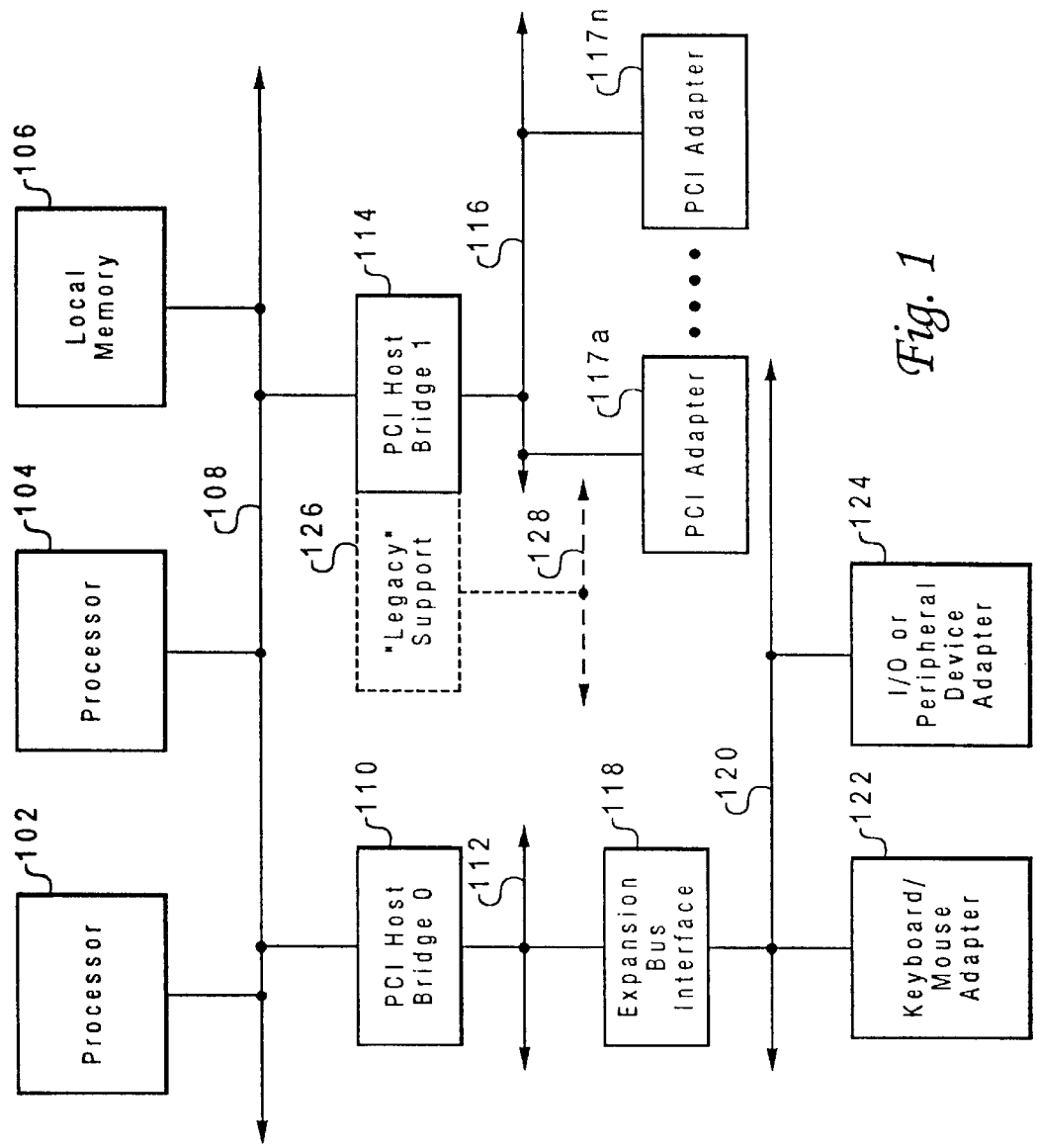
FIG. 1 depicts a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, an RS/6000™ system, a product of IBM Corporation of Armonk, N.Y. Data processing system 100 thus includes processors 102 and 104 and local memory 106 connected to system bus 108. Also connected to system bus 108 is a host bridge ("PCI Host Bridge 0") 110, which provides an interface between system bus 108 and PCI bus 112. Additional host bridges, such as host bridge ("PCI Host Bridge 1") 114, provide similar interfaces between system bus 108 and PCI buses. Host bridge 114 provides an interface to PCI bus 116. At least one PCI adapter card 117a–117n may connect to PCI bus 116.

Connected to PCI bus 112 are PCI adapter cards and/or expansion bus bridge 118, which provides an interface between PCI bus 112 and expansion bus 120. Expansion bus 120 may be an ISA or EISA bus, and provides slots for connection of input devices such as keyboard/mouse adapter 122. Other I/O or peripheral devices, such as a CD-ROM, may also be connected to expansion bus 120 through device adapter 124.

Those skilled in the art will appreciate that the hardware depicted in FIG. 1 may vary. For example, other peripheral devices such as optical disk drives and the like also may be utilized in addition to or in place of the hardware depicted. The example depicted is not meant to imply architectural limitations. Any data processing system which utilizes a PCI bus architecture or other bus architectures may also employ the present invention.

In accordance with a preferred embodiment of the present invention, at least one host bridge and PCI bus pair depicted in FIG. 1 implements an enhanced PCI bus architecture. For example host bridge 114 and PCI bus 116 may implement the enhanced PCI bus architecture (enhanced PCI) of the present invention, while host bridge 110 and PCI bus 112 may implement a bus conforming to the existing PCI bus architecture specification ("legacy PCI"). The enhanced PCI bus 116 supports existing PCI protocols and signal ordering rules. Functional operations, such as Retry, of the existing PCI bus architecture are also supported. The enhanced PCI bus architecture supports a 32 bit Address/Data bus, and may support a 64 bit Address/Data bus if the pin count for such support can be provided.

While supporting much of the existing PCI bus architecture protocols, the enhanced PCI bus architecture employs differential signaling on the host bridge, PCI bus, and devices or adapter cards connected to the enhanced PCI bus. Thus, two signal lines are required for each signal in the enhanced PCI bus architecture definition. A new connector for the enhanced PCI architecture must also be defined. Adding the differential signaling environment should be transparent to the PCI protocol, and an increased frequency may be achieved, scalable up to a maximum frequency dependent on the driver/receiver technology selected. When operating at a significantly higher frequency, PCI timing requirements must be adjusted based on the driver/receiver technology employed and actual maximum frequency selected.

Because much of the existing or "legacy" PCI protocol is supported, host bridge 114 for enhanced PCI bus 116 may provide integral legacy support 126 for a legacy PCI bus 128. The same circuits may be employed for many operations required of host bridge 114/126, with the exception of the receiver and output driver stages to the separate buses 116 and 128. Thus a single enhanced/legacy PCI bridge 114/126 may support connections to both enhanced and legacy PCI devices, although on separate buses. Alternatively, a separate bridge connected to enhanced PCI bus 116 may provide bridge support connection to legacy PCI devices, or support for legacy PCI devices may be provided by a separate PCI host bridge 110.

Figure 2B:
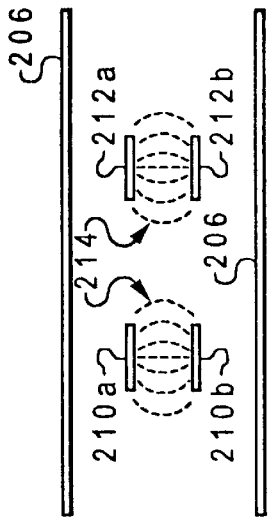
FIGS. 2A–2B are comparative diagrams of signal lines on a backplane or adapter card within a data processing system.
Figure 2A:
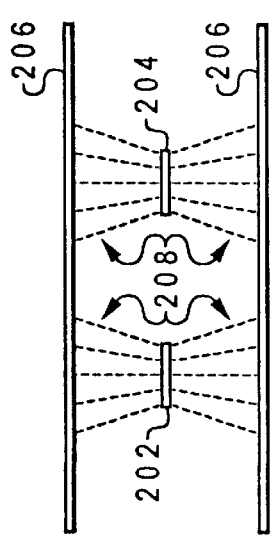

Referring to FIGS. 2A and 2B, comparative diagrams of signal lines on a backplane or adapter card within a data processing system are illustrated. FIG. 2A illustrates the effect of employing conventional signal lines. Conventional single-ended signal detection currently employed by the PCI bus architecture requires detection of a signal level (high or low) with respect to ground. Capacitive cross-coupling between the signal lines 202 and 204 and ground 206 results in electromagnetic field 208. Energy is thus expended during transfer of information on the bus for charging and discharging bus capacitances. Signal lines may also cross-couple or interfere between each other, creating noise problems.

FIG. 2B illustrates a signal line pair arrangement for a backplane or adapter card within an enhanced PCI bus in accordance with a preferred embodiment of the present invention. The signal line arrangement illustrated is applicable to PCI based systems as well as to other systems. Rather than conventional single-ended signal lines presently used in PCI bus architectures, differential signal line pairs 210a–210b and 212a–212b are employed. A differential signal requires two lines per signal, and information is transferred by detecting either a polarity or a magnitude of a voltage difference between the two signal lines.

Signal line pairs 210a–210b and 212a–212b preferably transmit signals which are equal in magnitude but opposite in polarity. That is, if signal line 210a carries a signal of +1.0V, signal line 210b simultaneously carries a signal of −1.0V. As a result, the electromagnetic field between a signal line pair, such as signal line pair 210a–210b, and ground 206 is negligible, since the electromagnetic field between one signal line 210a and ground 206 cancels the electromagnetic field between the other signal line 210b and ground 206. Only the electromagnetic field 214 between signal lines in a signal line pair—between signal lines 210a and 210b, for example—remains significant. As shown, the electromagnetic field formed between differential signal lines in a signal line pair is much smaller and more localized than the electromagnetic field between a conventional single-ended signal line and ground. Therefore, when compared to the conventional signaling environment, a much lower signal transition is required to transfer information. Less energy is expended on the bus charging and discharging capacitance during transfer of information. Moreover, utilizing differential signaling improves noise immunity and allows higher transfer rates to be achieved.

As much as possible, the differential signal line pairs 210a–210b and 212a–212b are routed together on the motherboard and add-in adapter cards employed in the data processing system. This assures that the differential signaling benefits—the canceling effect of cross-coupling between signal lines and ground or other signal lines—are realized. However, routing signal line pairs together precludes backward-compatibility with legacy PCI bus connectors, which do not include physical space within the connector definition for the additional signal lines required. Also, the PCI bus interface chips preferably include differential drivers/receivers.

Figure 3B:
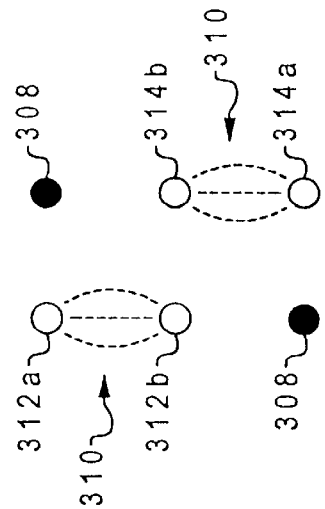
FIGS. 3A–3B depict comparative diagrams of pin layouts for an adapter card connector within a data processing system.
Figure 3A:
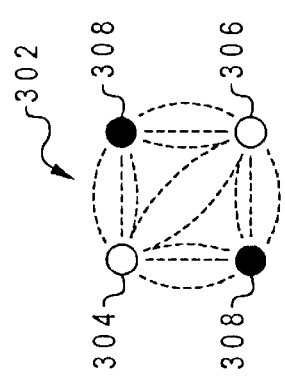

With reference to FIGS. 3A and 3B, comparative diagrams of pin layouts for an adapter card connector within a data processing system are depicted. FIG. 3A depicts a conventional signal pin arrangement. The electromagnetic field 302 between signal pins 304 and 306 and ground pins 308 may be substantial, as shown. FIG. 3B depicts a differential signal pair arrangement for an enhanced PCI bus in accordance with a preferred embodiment of the present invention. The connector pin arrangement depicted would be applicable to PCI based systems as well as to other systems. To take advantage of the benefits of differential signaling and for signal quality, each of the two pins forming a differential pair are placed adjacent to each other in the connector. Similar to the signal line arrangement in FIG. 2B, the electromagnetic field 310 between signal pin pairs 312a–312b and 314a–314b is much smaller and more localized than found in connectors using conventional signal pin arrangement for legacy PCI bus connections. A connector pin arrangement as shown also may allow an enhanced PCI bus cable using twisted pair lines for each signal pair to be 10 feet or longer for PCI bus extension.

Figure 4:
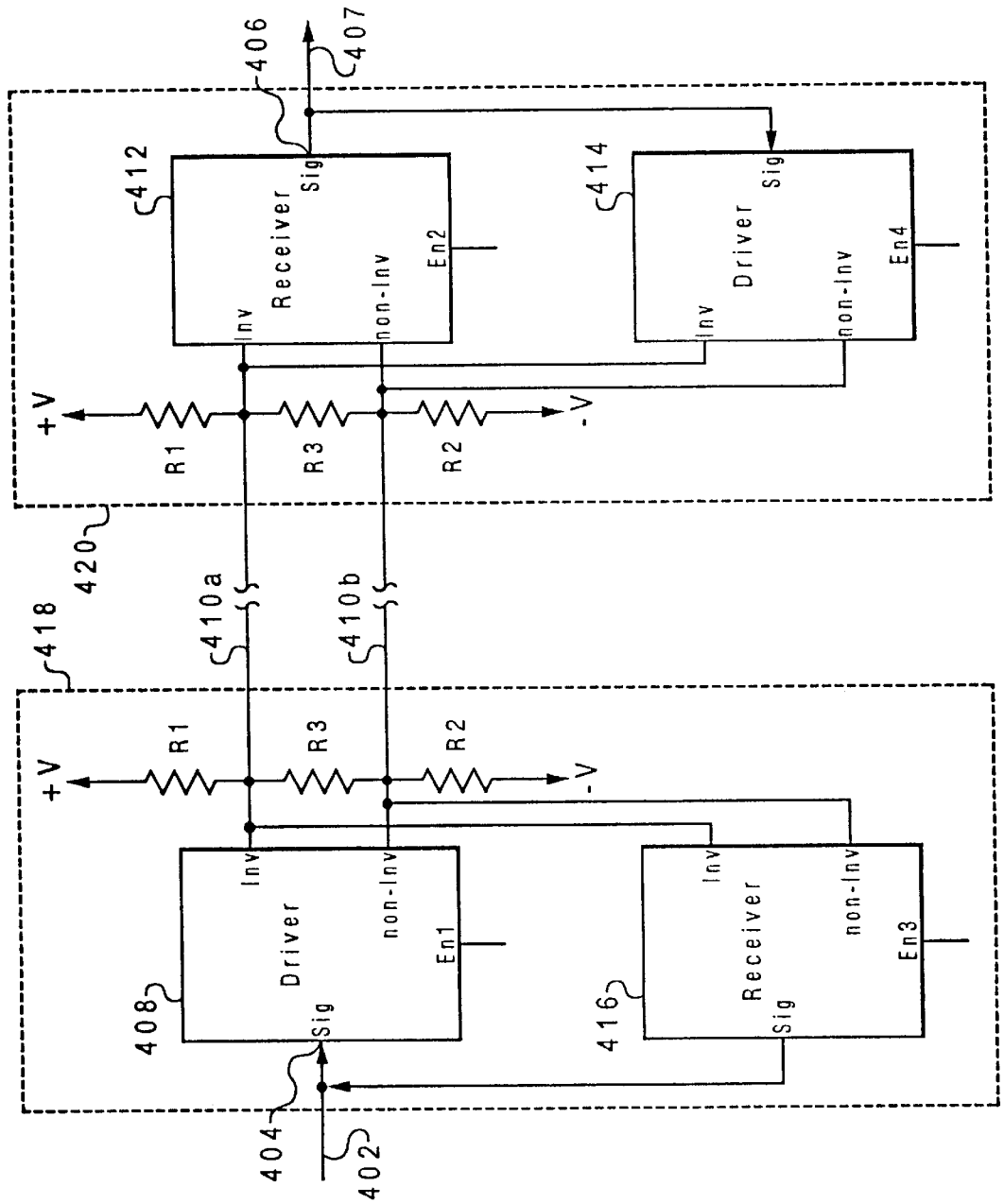
FIG. 4 is a block diagram of a bi-directional signaling net for an enhanced PCI bus utilizing differential signaling in accordance with a preferred embodiment of the present invention.

Referring to FIG. 4, a block diagram of a bi-directional signaling net for an enhanced PCI bus utilizing differential signaling in accordance with a preferred embodiment of the present invention is illustrated. This type of signaling net may be employed for all Address/Data and other signal lines in an enhanced PCI bus which require bi-directional capability. Signaling net 402 receives and transmits at an input/output 404 a single-ended signal from an enhanced PCI bus master or target (not shown). The bus master may be a PCI host bridge or any other PCI device capable of acting as a PCI bus master. Signaling net 407 transmits and receives a single-ended signal from an enhanced PCI bus target or bus master (not shown) at input/output 406. The bus target may be an adapter card or any other PCI device serving as a PCI bus target. Both the bus master and the bus target according to the invention utilize the enhanced PCI bus definition.

Input 404 is connected to single-ended-to-differential driver 408 associated with the PCI bus master, which converts the single-ended signal to a differential signal in accordance with methods known in the art. Driver 408 transmits the differential signal on differential signal line pair 410a–410b. The differential signal transmitted may indicated different states in a variety of manners. For example, two different states may be defined by a voltage difference on differential signal line pair 410a–410b which remains constant in magnitude but changes direction, such as when the polarity of the voltage difference is reversed. A first polarity may represent a first state ("high") while the opposite polarity represents a second state ("low"). Alternatively, the voltage difference on differential signal line pair 410a–410b may remain constant in direction or polarity, but change magnitude in opposite directions, with a first magnitude representing a first state and a second magnitude representing a second state. In either case, however, the voltages applied to differential signal line pair 410a–410b should have the same magnitude change but opposite directions with respect to ground, so that the cancelling effect may be achieved.

Differential signal line pair 410a–410b is also connected to receiver 412 associated with the PCI bus target, which transforms the differential signal to a single-ended signal by methods known in the art. The resulting single-ended signal is transmitted on output 406 to the PCI bus target. Since bi-directional signaling is required, a second driver 414 associated with the PCI bus target is connected to output 406 and differential signal line pair 410a–410b. Driver 414 receives single-ended signals at output 406 from the PCI bus target and transmits corresponding differential signal on differential signal line pair 410a–410b. A receiver 416 associated with the PCI bus master is connected to differential signal line pair 410a–410b and input 404, transforming differential signals received to single-ended signals and transmitting the single-ended signals to the PCI bus master.

Drivers 408 and 414 and receivers 412 and 416 each include an enable signal input, preventing the respective devices from transmitting or receiving unless asserted. The signals applied to these enable signal inputs are coordinated to ensure that only one driver is transmitting during a given bus cycle.

In addition to cross-coupling, an additional problem with the conventional single-ended signal lines employed in existing PCI architectures is reflective signaling, which limits the physical length of the PCI bus and thus limits fan-out. Employing balanced loads on the signal lines eliminates reflections and results in single incident signaling. Therefore, each transceiver 418 and 420 comprising a driver/receiver pair associated with either the PCI bus master or PCI bus target includes a resistive load at the connection to differential signal line pair 410a–410b. The resistive load comprises resistance R1 connected between an upper power supply voltage and one differential signal line 410a, resistance R2 connected between and lower power supply voltage and the other differential signal line 410b, and resistance R3 connected between the differential signal lines 410a and 410b. The values of R1, R2, and R3 are selected to ensure that the loads seen by differential signal line pair 410a–410b remains substantially balanced and constant regardless of which transceiver 418 or 420 is transmitting and which is receiving. Each set of resistive loads for each differential signal may be located on the motherboard, one set near the PCI host bridge and the other set at the opposite end of the PCI bus.

Figure 5:
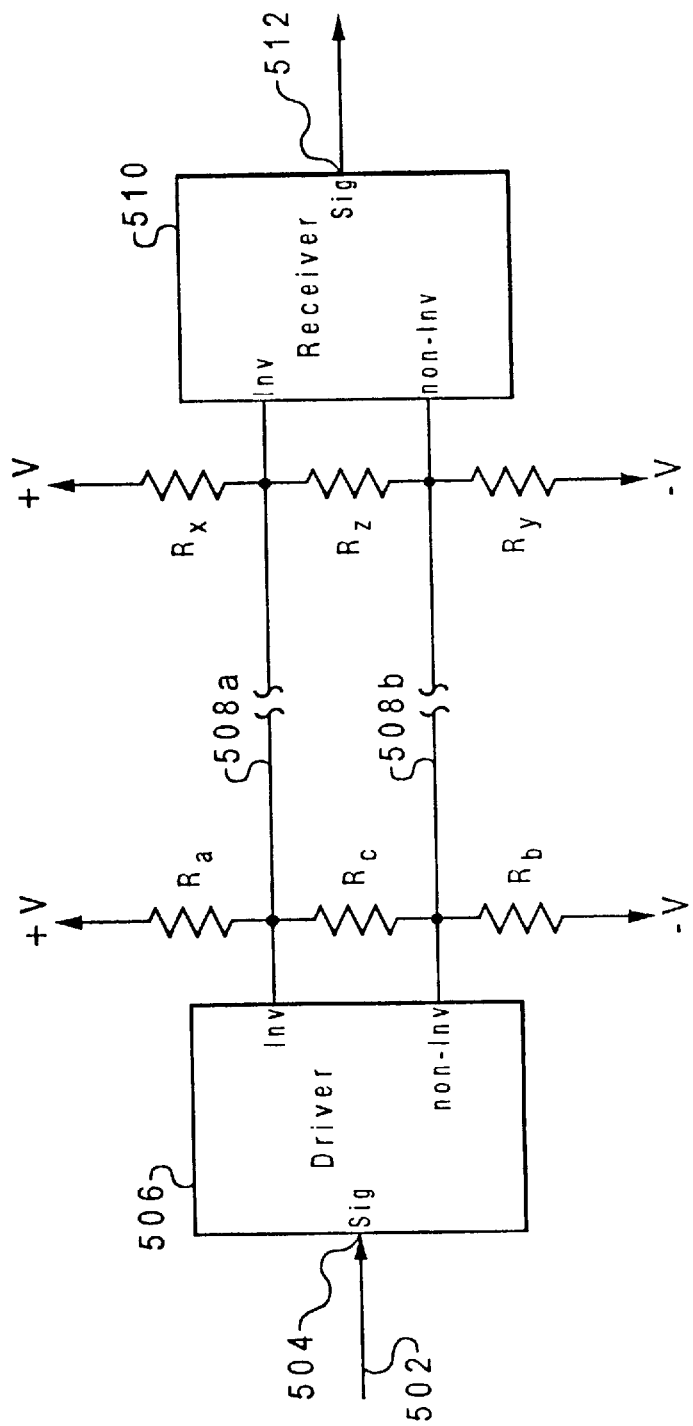
FIG. 5 depicts an alternative signaling net for an enhanced PCI bus utilizing differential signaling in accordance with a preferred embodiment of the present invention.

With reference to FIG. 5, a block diagram of an alternative signaling net for an enhanced PCI bus utilizing differential signaling in accordance with a preferred embodiment of the present invention is depicted. This simpler signaling net may be employed for signal lines which do not require bi-directional capability, such as REQ#, GNT#, etc. Signaling net 502 receives single-ended signals from a bus master or target (not shown) at input 504 connected to driver 506. Driver 506 transforms the single-ended signals to differential signals and transmits the differential signals on differential signal line pair 508a–508b. Receiver 510 connected to differential signal line pair 508a–508b transforms the differential signals to single-ended signals and transmits the single-ended signals on output 512 to a bus master or target (not shown).

Resistive loads associated with both driver 506 and receiver 510 ensure that differential signal line pair 508a–508b is connected to a balanced load. This is accomplished at driver 506 by resistance $R_a$ connected between an upper power supply voltage and differential signal line 508a, resistance $R_b$ connected between a lower power supply voltage and differential signal line 508b, and resistance $R_c$ connected between differential signal lines 508a and 508b. A similar resistive load configuration is associated with receiver 510, although providing a balanced load at receiver 510 may require that different resistance values $R_x$, $R_y$, and $R_z$ be employed.

Figure 6A:
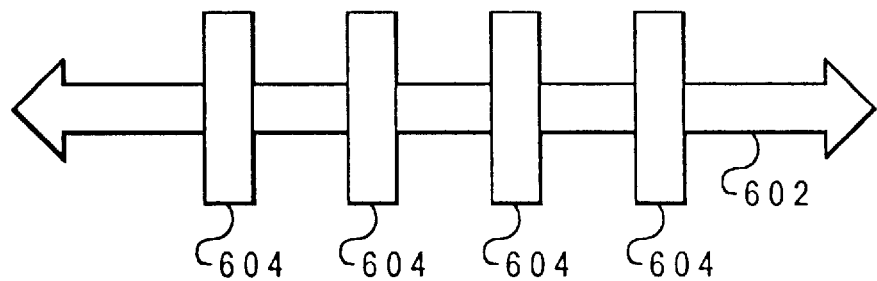
FIGS. 6A–6C are diagrams for providing dummy loads within a PCI slot in accordance with a preferred embodiment of the present invention.
Figure 6B:
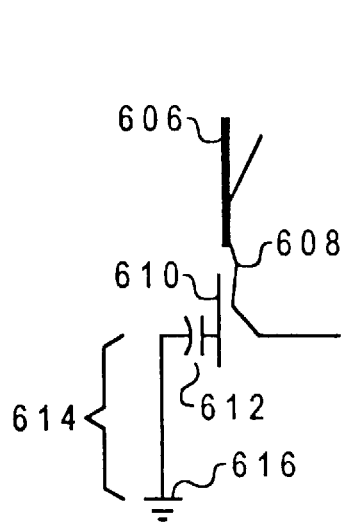
Figure 6C:
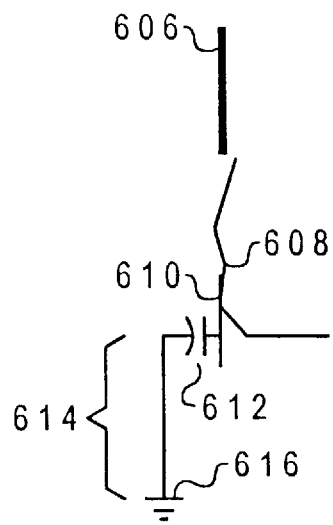

Referring to FIGS. 6A–6C, diagrams for providing dummy loads within a PCI slot in accordance with a preferred embodiment of the present invention is illustrated. The differential signaling connector employed in an enhanced PCI bus for high speed operation may be a simple pin-in-socket type of connector providing two pins for each signal. However, if the bus is not fully populated (contains empty adapter slots), the bus loading may vary widely. Since the enhanced PCI bus needs to utilize a balanced, terminated bus to maximize fan-out, a bus designed to compensate for empty slots may be somewhat limited.

One solution is to require dummy load cards to be installed in slots 604 not occupied by a real adapter. This allows the loading on the bus to be defined regardless of the number of real adapters by including dummy cards in the calculations, thereby permitting greater fan-out to be achieved for each enhanced PCI bus. However, this requires locating a dummy card for each slot occupied by an adapter card when the adapter cards are removed. Dummy loads may be incorporated into the planar board, but an additional pin would be required for each signal to connect to the planar. Therefore, a preferable arrangement is to incorporate the dummy loads into the adapter slot connector.

Dummy loads may be incorporate into the adapter slot connector for each signal line. FIG. 6A illustrates an enhanced PCI bus 602 containing adapter slots 604. The connector for each adapter slot contains a plurality of contacts, each connected to a single conductor of the enhanced PCI bus. When an adapter in inserted into the adapter slot, each contact makes electrical connection to a pin on the adapter. The bus includes several conductors which are connected to ground.

FIG. 6B illustrates a contact arrangement employed within the adapter slot connectors for each signal line or conductor in the enhanced PCI bus. A 3-way make-before-break feature is incorporated in the adapter slot connector. The pin 606 of an adapter card inserted into the adapter slot makes electrical contact with a mechanically biased contact 608 connected to the respective bus conductor corresponding to pin 606. Contact 608 is mechanically biased in the direction of contact 610. Contact 610 is connected to the dummy load, which in the depicted example comprises a 10 pF capacitor 612 connected in series to a ½"–1½" line length or equivalent 614, which is connected in series to ground contact 616 within the connector, simulating the signal load of an adapter card inserted into the adapter slot. When an adapter card is inserted into the adapter slot, contact 608 is physically separated from contact 610. Ground contact 616 within the connector is one of the contacts electrically connected to a bus conductor connected to ground.

When the adapter card is removed from the adapter slot, contact 608 moves in the direction of contact 610, making physical and electrical contact with contact 610. Thus, each bus conductor or signal is automatically connected to a dummy load within the connector when the adapter slot is empty, and to the appropriate adapter pin when the adapter slot is populated. An additional pin from the connector to the planar for each signal line is not required.

The connector of the present invention maintains balanced and defined signal loading in an enhanced PCI bus regardless of the mix of populated and empty adapter slots. This allows a fan-out of as many as four or more slots to be achieved, depending on the operating frequency. A tradeoff may be made to achieve higher operating frequency by employing fewer adapter slots. By utilizing differential signaling, lower signal voltage operations can also be utilized, allowing higher frequency operation and utilization of lower signal voltage chip technology. With the connector of the present invention, an enhanced PCI bus utilizing differential signaling can attain peak data transfer rates of up to 1.5 GB/sec or higher.

While the invention has been particularly shown and described with reference to a preferred embodiment, it will be understood by those skilled in the art that various changes in form and detail may be made therein without departing from the spirit and scope of the invention.

What is claimed is:

1. A method of supporting differential signaling in a PCI bus within a data processing system, said PCI bus comprising a plurality of bus signal conductors including bus conductors connected to ground, comprising:

providing a connector for an adapter slot within said data processing system, said connector including a plurality of contacts, each contact within said plurality of contacts electrically connected to a bus conductor within said plurality of bus conductors; and when said adapter slot is empty, connecting each contact within said plurality of contacts to a dummy load simulating a signal load of an adapter, wherein a balanced load is provided for a PCI bus utilizing differential signaling.

2. The method of claim 1, wherein said step of connecting each contact to a dummy load further comprises:

connecting each contact within said plurality of contacts to a capacitor, said capacitor connected in series to a ground contact within said plurality of contacts, said ground contact electrically connected to one of a plurality of bus conductors connected to ground.

3. The method of claim 2, wherein said step of connecting each contact to a capacitor further comprises:

connecting each contact to an approximately 10 pF capacitor connected in series to said ground contact.

4. The method of claim 1, further comprising:

responsive to an adapter being inserted into said adapter slot, disconnecting said each contact within said plurality of contact from said dummy load; and connecting each contact within said plurality of contacts to a different pin within a plurality of pins on said adapter.

5. The method of claim 4, further comprising:

responsive to said adapter being removed from said adapter slot, disconnecting said each contact from said pin; and connecting said each contact within said plurality of contacts to said dummy load.

6. An apparatus for supporting differential signaling in a PCI bus within a data processing system, said PCI bus comprising a plurality of bus conductors including bus conductors connected to ground, comprising:

connector means for an adapter slot within said data processing system, said connector including a plurality of contacts, each contact within said plurality of contacts electrically connected to a bus conductor within said plurality of bus conductors; and connection means, when said adapter slot is empty, for connecting each contact within said plurality of contacts to a dummy load simulating a signal load of an adapter, wherein a balanced load is provided for a PCI bus utilizing differential signaling.

7. The apparatus of claim 6, wherein said connection means further comprises:

connection means for connecting each contact within said plurality of contacts to a capacitor, said capacitor connected in series to a ground contact within said plurality of contacts, said ground contact electrically connected to one of a plurality of bus conductors connected to ground.

8. The apparatus of claim 7, wherein said connection further comprises:

connection means for connecting each contact to an approximately 10 pF capacitor connected in series to said ground contact.

9. The apparatus of claim 6, further comprising:

disconnection means, responsive to an adapter being inserted into said adapter slot, for disconnecting said each contact within said plurality of contact from said dummy load; and second connection means for connecting each contact within said plurality of contacts to a different pin within a plurality of pins on said adapter.

10. The method of claim 9, further comprising:

disconnection means, responsive to said adapter being removed from said adapter slot, for disconnecting said each contact from said pin; and reconnection means for connecting each contact within said plurality of contacts to said dummy load.

11. A PCI bus connector, comprising:

a plurality of contacts in said connector, each contact within said plurality of contacts electrically connected to a PCI bus conductor; and a dummy load simulating an adapter signal load selectively connected to said plurality of contacts when said connector is not connected to an adapter, wherein said PCI bus connector provides a balanced load that is provided for a PCI bus utilizing differential signaling.

12. The connector of claim 11, wherein said dummy load further comprises a capacitor connected to a ground contact.

13. The connector of claim 12, wherein said capacitor further comprises an approximately 10 pF capacitor.

14. The connector of claim 12, wherein said ground contact further comprises a contact within said plurality of contacts connected to ground.

15. The connector of claim 12, wherein said plurality of contacts are biased in the direction of said dummy load.

16. The connector of claim 15, wherein said adapter, when connected to said connector, prevents said plurality of contacts from connecting to said dummy load.

17. A method of configuring an adapter connector for a PCI bus employing differential signaling, comprising:

connecting a dummy load simulating an adapter signal load to a dummy load contact for a bus conductor within said connector; and biasing a bus contact within said connector in a direction of said dummy load contact such that said bus contact selectively engages said dummy load contact when no adapter is present in said connector.

18. The method of claim 17, wherein said step of biasing a bus contact further comprises:

forming said bus contact to selectively disengage from said dummy load contact when an adapter is inserted in said connector.

19. The method of claim 18, wherein said step of biasing a bus contact further comprises:

engaging said bus contact with a corresponding adapter contact on said adapter prior to disengaging said bus contact from said dummy load contact when said adapter is inserted in said connector;

engaging said bus contact with said dummy load contact before disengaging said bus contact from said adapter contact when said adapter is removed.

20. The method of claim 17, wherein said step of biasing a bus contact further comprises:

forming said bus contact as a spring biased in said direction of said dummy load contact and displaced by insertion of an adapter in said connector.

21. The method of claim 17, further comprising:

connecting a plurality of dummy loads, each dummy load simulating an adapter signal load, to a plurality of dummy load contacts for a corresponding plurality of bus conductors.

22. The method of claim 21, further comprising:

biasing a plurality of bus contacts within said connector in a direction of said plurality of dummy load contacts, wherein said plurality of bus contacts selectively engage said plurality of dummy load contacts when no adapter is present in said connector.

* * * * *